(12) United States Patent
Karjoth et al.

(10) Patent No.: US 8,122,484 B2
(45) Date of Patent: Feb. 21, 2012

(54) ACCESS CONTROL POLICY CONVERSION

(75) Inventors: Guenter Karjoth, Waedenswil (CH);
Elsie A. Van Herreweghen, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/101,694

(22) Filed: Apr. 11, 2008

(65) Prior Publication Data

US 2009/0178107 A1 Jul. 9, 2009

(30) Foreign Application Priority Data

Jan. 9, 2008 (EP) .................................... 08100284

(51) Int. Cl.
*G06F 17/00* (2006.01)
(52) U.S. Cl. .............. 726/2; 726/27; 709/229; 709/225
(58) Field of Classification Search ................ 726/1, 26, 726/2, 27; 709/229, 225
See application file for complete search history.

(56) References Cited

U.S. PATENT DOCUMENTS

| | | | |
|---|---|---|---|
| 7,197,764 B2 * | 3/2007 | Cichowlas | 726/6 |
| 7,409,447 B1 * | 8/2008 | Assadzadeh | 709/225 |
| 7,454,788 B2 * | 11/2008 | Burnett et al. | 726/17 |
| 7,594,256 B2 * | 9/2009 | Bhat et al. | 726/1 |
| 7,653,930 B2 * | 1/2010 | Griffin et al. | 726/1 |
| 7,685,632 B2 * | 3/2010 | Vayman | 726/10 |
| 7,821,926 B2 * | 10/2010 | Hannel et al. | 370/229 |
| 7,853,993 B2 * | 12/2010 | Vayman | 726/4 |
| 7,856,652 B2 * | 12/2010 | Hieda | 726/1 |
| 7,870,596 B2 * | 1/2011 | Schackow et al. | 726/1 |
| 7,908,642 B2 * | 3/2011 | Rubio et al. | 726/2 |
| 2004/0162906 A1 * | 8/2004 | Griffin et al. | 709/229 |
| 2007/0056019 A1 | 3/2007 | Allen | |

OTHER PUBLICATIONS

Kolovski, et al, "Analyzing Web Access Control Policies", ACM, WWW 2007, May 8-12, 2007, pp. 677-686.
Periorellis, et al, "XACMIL-Role Based Access Control", Mar. 2006.

* cited by examiner

*Primary Examiner* — Krisna Lim
(74) *Attorney, Agent, or Firm* — William Stock; Anne Vachon Dougherty

(57) ABSTRACT

Methods and apparatus are provided for generating an access control policy data structure for a single-authorization-query access control system from a source policy data structure of an access control system in which primary authorizations can be subject to auxiliary constraints. Authorizations in the data structures are defined in terms of subject, resource and action elements. For each resource in a set of resources in the source policy data structure, the data structure is analyzed to identify primary authorizations relating to that resource. For each primary authorization, policy data which represents a policy defining an access rule expressing that authorization is generated and stored in system memory and analyzed to identify any auxiliary constraints associated with that primary authorization. For each auxiliary constraint so identified, policy data is generated and stored in system memory.

18 Claims, 2 Drawing Sheets

ACCESS CONTROL POLICY CONVERSION

FIELD OF THE INVENTION

This invention relates generally to conversion of access control policy data structures, and more particularly to methods and apparatus for generating an access control policy data structure for a single-authorization-query access control system from a source policy data structure of an access control system in which primary authorizations can be subject to auxiliary constraints.

BACKGROUND OF THE INVENTION

Access control systems provide mechanisms for regulating access by users to resources in data processing systems. Access control is fundamental for enforcing security and privacy requirements in data processing systems, protecting system resources such as files, applications, databases etc., against unauthorized access by internal or external system users. In simple terms, access control involves the assignment of authorizations to users, whether individuals or groups, specifying the extent of users' permitted access to resources, and the evaluation of requests for access to resources to check for appropriate authorization, allowing enforcement of access restrictions as required in a given system. Authorizations form the basis of an overall access control policy which specifies the set of access constraints for a given system. The access control policy is defined by some form of data structure, which may have a number of component data structures, stored in system memory. In a typical access control scenario, a user sends an access request to the system component, such as a web server or file server, which protects the resource to which access is requested. The protecting component then sends an authorization query, asking if the user has the necessary authorization, to a decision engine of the access control system. The decision engine accesses the policy data structure to determine if the user is authorized as required, and notifies the protecting system accordingly. The access request is then permitted or denied as appropriate.

Whatever the particular architecture of the access control system, access queries are typically framed in terms of some form of subject, resource and action elements. Here, the subject element gives information about the user(s) making the request. The resource element identifies the resource(s) to which access is requested. The action element indicates the type of operation the requester wishes to perform on the resource. Authorizations are similarly expressed in the policy data structure in terms of these three basic elements, where in general an authorization indicates (explicitly or implicitly) that subject(s) X has permission to do action Y to resource(s) Z. ACL (access control list)-based access control systems provide a particular example here. Beyond this basic subject/resource/action concept, however, the access control decision logic, and the particular way in which policy is represented in policy data structures, can vary widely in access control systems.

XACML® (extensible access control markup language) is a current OASIS® (OASIS and XACML are trademarks of OASIS) initiative to develop a standard for access control systems. This standard is described in detail on the OASIS eXtensible Access Control Markup Language (XACML) Technical Committee Web page available on the oasis-open.org web site at the committees/tc home.php?wg abbrev=xacml#XACML20 page Briefly, XACML defines a language and logic for expressing and evaluating policy in an access control policy data structure, together with a query/response language, based on the simple subject/resource/action concept just described. In the XACML system, authorizations are expressed in access rules which specify the subject, resource and action elements of an authorization. These elements may define the applicable subjects, resources, and actions specifically, or may be wildcard elements (AnySubject, AnyResource, AnyAction) which match all specific elements in the corresponding category. XACML access rules have an "effect" which is either "permit" or "deny". For example, a rule expressing authorization of a user Alice to read a data object "Order" can be defined by:

```
<rule effect="Permit">
    <target <subject Alice>
        <resource Order>
        <action Read>
    </target>
</rule>
```

Groups of rules can be combined via logical algorithms into "policies", and groups of policies can be similarly combined into "policy sets". The applicability of rules, policies and policy sets to access queries is defined by "targets" which specify the set of subject, resource and action elements to which the corresponding entity applies. Thus, the overall access control policy data structure in XACML typically comprises multiple policy sets, each specifying the logical algorithms to be applied by the decision logic to policies, and, within those policies, rules, which apply to particular combinations of subject/resource/action elements. In operation, the decision logic compares the subject/resource/action triple in an access query to the targets in the data structure to identify the applicable policy sets, policies and rules, and then evaluates these accordingly. This evaluation yields a permit or deny decision in response to the access request.

The XACML system just described is an example of a "single-authorization-query" access control system. That is, the access query specifies a single authorization whose existence is to be checked for in the policy data structure, and the decision logic is designed to reach a decision based on evaluation of that authorization only. In more sophisticated access control systems, access decisions can be based on evaluation of more than a single authorization. In particular, access control policies can offer greater subtlety in the definition of authorization constraints by utilizing additional, auxiliary authorizations over and above the authorizations ("primary authorizations") which might be specified in an access query. In general, such auxiliary authorizations and other auxiliary access conditions or restrictions may be defined explicitly or implicitly in the access control policy data structure. These auxiliary constraints must then be identified and evaluated by the decision logic as well as the primary authorization specified in the access query. An example of such an access control system is provided by the IBM® Tivoli® Access Manager system (IBM and Tivoli are registered Trade Marks of International Business Machines Corporation). This system is described in detail in "Access Control with IBM Tivoli Access Manager", Günter Karjoth, ACM Transactions on Information and System Security (TISSEC) Vol. 6, No. 2, May 2003, pages 1-25, but a brief description will be given below to assist understanding of the invention to be described.

With the IBM Tivoli Access Manager (TAM) system, a resource is protected by an application server, known as a reference monitor, which formulates access queries based on user access requests and sends the access queries to an authorization server. Access queries request checking for authorizations based on subject, resource and action elements as described above, and are evaluated by decision logic of the authorization server against an access control policy defined in a system database. The access control policy is represented by a composite data structure which uses access control lists (ACLs) and protected object policies (POPs) associated with "protected objects", or "objects" for short, which are logical representations of resources. Access to a resource is controlled by attaching an ACL and/or POP to the corresponding object. Authorizations are considered as permissions assigned to users, where a "permission" is a resource/action pair (i.e. permission to do action Y to resource(s) Z). Primary authorizations (those which might appear in the subject/resource/action triple of an access query) can be expressed in ACLs, but the policy data structure can also express auxiliary constraints. These auxiliary constraints may express additional authorizations or conditions associated with primary authorizations. Auxiliary constraints may be defined explicitly or implicitly in the data structure, and must be identified and evaluated along with their associated primary authorization in order to correctly express the access constraint specification of the overall access control policy. One example of an auxiliary authorization in this system is provided by the "Traverse" permission which can be assigned to users. Briefly, the system employs a hierarchical representation of resources (objects), some with associated ACLs/POPs. An object without an attached ACL inherits the nearest ACL attached to an object above it in the hierarchy. This leads to the concept of "regions". Objects in a region are accessible if the requesting user (explicitly or implicitly) has Traverse authorization (i.e. the Traverse permission has been assigned to that user) on all objects above it in the hierarchy. Thus, in checking for a primary authorization corresponding to an access query for an object, Traverse authorizations on parent objects may need to be checked for as auxiliary authorizations. Other examples of auxiliary constraints which can be associated with a primary authorization in this system are provided by the ByPassPOP and ByPassRule authorizations which can override condition constraints expressed in a POP for example.

The great variety of access control systems on the market and in use within enterprises today makes it very difficult to provide centralized, safe and cost effective access control. Even if systems are based on the same base model such as ACLs, their policy languages and the evaluation of the authorization data is often quite different as exemplified above. US Patent Application Publication No. 2007/0056019 describes one attempt to address this type of problem. The application describes a system to implement access control requirements across dissimilar platforms, and involves capturing the requirements within a UML (Unified Modeling Language) model, translating that model into a UAL (Universal Authorization Language), and using adapters to implement parts of the UAL policy in the various platform access control systems. This is a very specific way of dealing with the particular problem addressed. At a more general level, the XACML standard described above has the potential to serve as a "lingua franca" for access control systems as it offers rich expressiveness and flexibility. Despite these features, the mapping to the XACML system is often far from trivial. In particular, for a source access control system in which primary authorizations can be subject to auxiliary constraints as discussed above, mapping to a single-authorization-query system like XACML presents the major problem that there is no mechanism for dealing with the auxiliary constraints. This problem is clearly illustrated by the following exemplary scenario based on conversion of a TAM access control policy to an XACML policy.

Assume that user 'Alice' can read the order for a new bicycle if she has the Read permission on object 'Order/Bicycle' and the Traverse permission on the parent object 'Order'. Below is a simplified XACML policy with two rules which could be derived from the source TAM policy stating that Alice has Read permission on 'Order/Bicycle' and everyone in group 'Dep44' has Traverse permissions on 'Order'.

```
<policy PolicyCombiningAlgorithm="permit-overrides">
  <rule
    <target <subject Alice>
        <resource Order/Bicycle>
        <action Read>
    </target>
  </rule>
  <rule
    <target <subject Dep44>
        <resource Order>
        <action Traverse>
    </target>
  </rule>
</policy>
```

However, as discussed above, an XACML decision engine can be queried for a single authorization only: access_allowed(subject+,resource+,action), denoting that there may be one or more subjects and resources but exactly one action. Each subject being part of the requester is represented by some credentials, user id and group ids for example. By "Alice+Dep44" we denote the credentials Alice (user id) and Dep44 (group id). If a query is made of the form
  access_allowed(Alice+Dep44,Order/Bicycle,Read)
then this will not match the target for the rule expressing the auxiliary, Traverse authorization (Alice+Dep44,Order, Traverse) because the action and subject elements are different in the primary authorization triple. Note that neither
  access_allowed(Alice+Dep44, {Order,Order/Bicycle}, Read)
nor
  access_allowed(Alice+Dep44, {Order,Order/Bicycle}, Traverse)
is a possible solution for the access query because the action elements do not match. Thus, the only apparent solution would be to ask the XACML decision engine twice:
  access_allowed(Alice+Dep44,Order/Bicycle,Read), and
  access_allowed(Alice+Dep44,Order,Traverse)
and somehow ensure that access is only permitted if both queries are answered positively. This would require modification of the reference monitor, including devising a mechanism that allows the reference monitor to decide in which cases a single call (Read) is sufficient.

It will be clear from the foregoing that the presence of auxiliary constraints poses a major obstacle to conversion of an access control policy data structure to a single-authorization-query system.

SUMMARY OF THE INVENTION

One aspect of the present invention provides a method for generating an access control policy data structure for a single-authorization-query access control system from a source policy data structure of an access control system in which primary authorizations can be subject to auxiliary constraints, authorizations in said data structures being defined in terms of subject, resource and action elements. The method comprises:

for each resource in a set of resources in the source policy data structure, analyzing that data structure to identify primary authorizations relating to that resource;

for each primary authorization, generating and storing policy data representing a policy defining an access rule expressing that authorization; and for each primary authorization, analyzing the source policy data structure to identify any auxiliary constraints associated with that primary authorization, and, for each auxiliary constraint so identified (a) generating and storing policy data representing a policy defining an access rule corresponding to that constraint, the access rule having subject, resource and action elements determined by (a1) copying the corresponding elements for the auxiliary constraint, subject to (a2) for each of the resource and action elements, at least if that element does not match that in the primary authorization, replacing the element by a wildcard element, and (b) defining a logical algorithm in the access control policy data structure to combine the auxiliary constraint policy with the primary authorization policy such that evaluation of the policy combination for an access query corresponding to the primary authorization yields the same result as in the source policy data structure.

Embodiments of the present invention allow a source policy data structure incorporating auxiliary constraints to be converted into an equivalent data structure for a single-authorization query access control system. Auxiliary constraints are identified and encoded as separate policies to the primary authorization policy. Each auxiliary constraint policy defines an access rule corresponding to the auxiliary constraint. The subject, resource and action elements of the access rule are generated by copying the corresponding elements for the auxiliary constraint in the source policy except that each of the resource and action elements is replaced by a wildcard element at least if that element does not match the corresponding element in the primary authorization. The resulting auxiliary constraint policy is then combined via a logical algorithm with the primary authorization policy such that evaluation of this policy combination for an access query on the primary authorization yields the same result as in the source access control policy. By combining auxiliary constraint policies which have wildcard elements as match criteria with primary authorization policies in this way, the evaluation of a primary authorization in response to an access request inherently involves evaluation of any auxiliary constraints affecting that primary authorization. The invention thus provides a clever and elegant technique for dealing with the problem of auxiliary constraints on conversion of policy data structures for use in single-authorization-query systems, allowing the authorization subtleties achieved via auxiliary constraints to be exactly mirrored in the single-authorization-query policy.

In general, the source policy data structure may represent an entire access control policy or only part thereof, and the set of resources to which the foregoing method is applied may be all or only a subset of the resources in that structure. Further, the identification of primary authorizations for each resource may be performed in general by analysis for individual resources or groups of resources, the specific nature of the analysis here depending of course on the particular construction of the source policy data structure. Similarly, the policy generated for a primary authorization may be a policy relating to a group of primary authorizations if appropriate, and may therefore encode more than one access rule. For instance, authorizations for a group of users to which the same permission has been granted could be grouped in the same primary authorization policy.

When determining the subject/resource/action elements for an auxiliary constraint access rule, the corresponding elements for the auxiliary constraint may be identified explicitly or implicitly in the source policy data structure according to the particular nature of that data structure, and the data structure will be analysed accordingly. In some embodiments, the resource and action elements will be replaced by wildcards in step (a2) only if the element does not match that in the related primary authorization (where an existing wildcard for that element in either the primary authorization or auxiliary constraint is deemed a match for any specific element). For simplicity, however, in preferred embodiments the resource and action elements are always replaced by wildcards in step (a2). In effect, steps (a1) and (a2) then reduce to: (a1) copying the subject element for the auxiliary constraint; and (a2) specifying the resource and action elements as wild.

When defining a logical algorithm in step (b) of the foregoing method, the algorithm may, in the limiting case, combine a single primary authorization policy with a single auxiliary constraint policy. However, both types of policy could be grouped in the algorithm, whereby one or more primary authorization policies could be combined with one or more auxiliary constraint policies. Also, the algorithm may directly or indirectly combine an auxiliary constraint policy with its primary authorization policy. In particular, auxiliary constraint policies may be nested in an algorithm with other auxiliary constraint policies, whereby the algorithm defined in step (b) may serve to combine the primary authorization policy with an auxiliary constraint policy in a nested group of auxiliary constraint policies. In this regard, for any primary authorization for which a plurality of relevant auxiliary constraints are identified, the method may include: analyzing those constraints to identify any logical dependencies among the constraints; and, for each logical dependency so identified, defining a logical algorithm in the access control policy data structure to combine the auxiliary constraint policies for the dependent constraints in accordance with that logical dependency. As mentioned above, auxiliary constraint policies may be combined in groups by an algorithm here, and the combinations could result in iterative nesting.

In general, a variety of logical algorithms could be used for combining policies. For simplicity, however, preferred embodiments use logical OR and logical AND algorithms. In the case of conversion to XACML, for example, the "permit-overrides" algorithm corresponds to a logical OR and the "deny-overrides" algorithm corresponds to a logical AND.

A second aspect of the invention provides a computer program comprising program code means for causing a computer to perform a method according to the first aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A third aspect of the invention provides apparatus for generating an access control policy data structure for a single-authorization-query access control system from a source policy data structure of an access control system in which primary authorizations can be subject to auxiliary constraints, authorizations in said data structures being defined in terms of subject, resource and action elements. The apparatus comprises memory for storing the data structures and control logic configured:

for each resource in a set of resources in the source policy data structure, to analyze that data structure to identify primary authorizations relating to that resource;

for each primary authorization, to generate and store in the memory policy data representing a policy defining an access rule expressing that authorization; and for each primary authorization, to analyze the source policy data structure to identify any auxiliary constraints associated with that primary authorization, and, for each auxiliary constraint so identified (a) to generate and store in the memory policy data representing a policy defining an access rule corresponding to that constraint, the access rule having subject, resource and action elements determined by (a1) copying the corresponding elements for the auxiliary constraint, subject to (a2) for each of the resource and action elements, at least if that element does not match that in the primary authorization, replacing the element by a wildcard element, and (b) to define a logical algorithm in the access control policy data structure to combine the auxiliary constraint policy with the primary authorization policy such that evaluation of the policy combination for an access query corresponding to the primary authorization yields the same result as in the source policy data structure.

Where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figure 1:
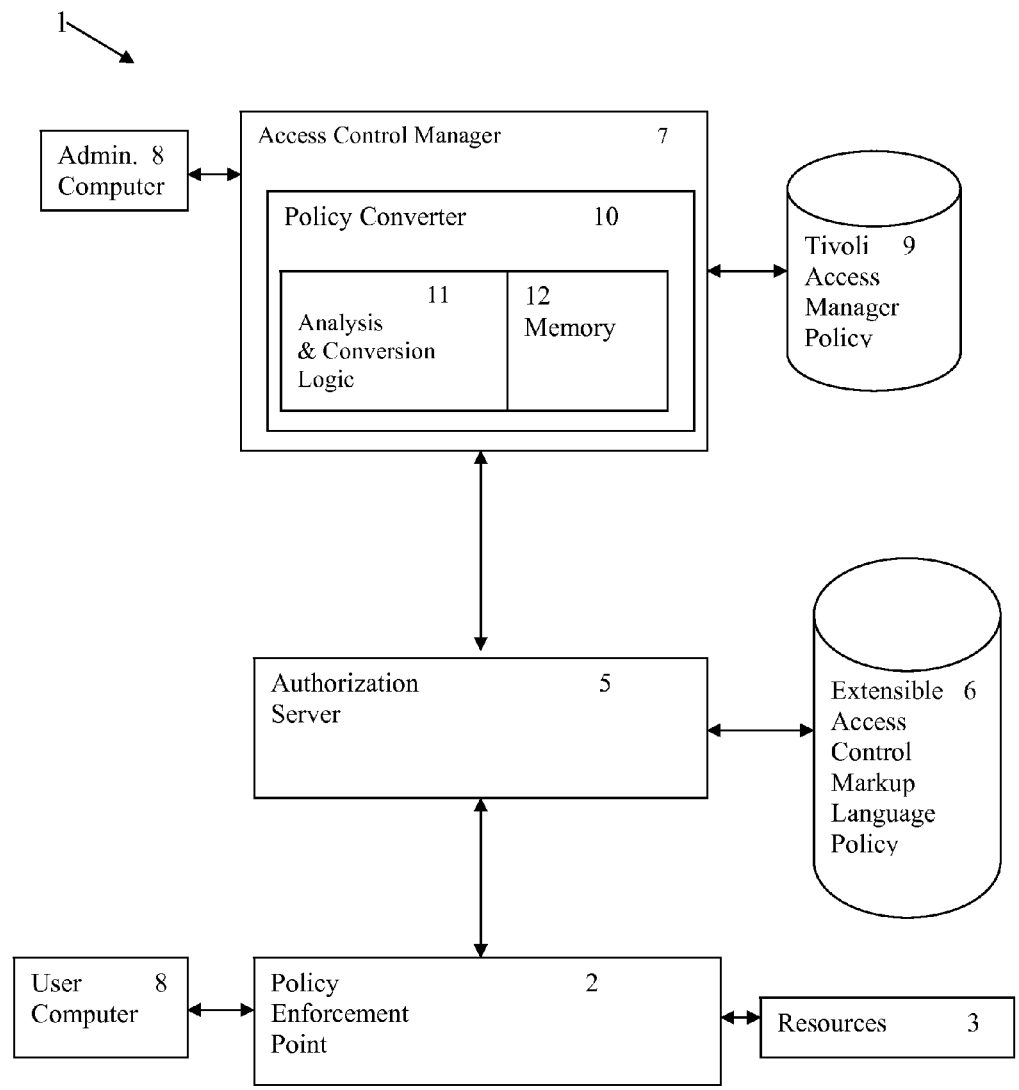
FIG. 1 is a schematic representation of an access control system which utilizes a policy conversion method embodying the invention.

The block diagram of FIG. 1 shows the main elements of an access control system 1 demonstrating an exemplary scenario in which policy conversion techniques embodying the invention can be employed. In this system, a policy enforcement point (PEP) 2, for example a server such as a file server or web server, controls access to resources 3, such as files or web pages, by users represented simply in the figure by user computer 4. In response to a user request for access to a resource 3, the PEP 2 communicates with an authorization server 5 of the system. Authorization server 5 incorporates an XACML decision engine for evaluating authorization queries from PEP 2 against an XACML policy data structure stored in policy database 6. The authorization server and PEP communicate via the standard XACML query/response system. In particular, in response to a user request, PEP 2 formulates an XACML authorization query of the form access_allowed (subject+,resource+,action) specifying the particular authorization to be checked for before permitting the user the requested access to the resource. In response to this authorization query, the XACML decision logic in authorization server 5 checks the XACML policy database 6 for the authorization in question by matching the subject, resource, action triple in the authorization query to targets in the XACML data structure. Based on this evaluation, authorization server 5 returns a "permit access" or "deny access" decision to PEP 2, whereby the user gains access to the resource only if he has the appropriate authorization.

The access control policy employed in system 1 is defined and maintained by an access control manager server 7 in response to administrator input via administrator computer 8. In particular, in this exemplary scenario, the access constraints in system 1 are specified at the administrator level in a TAM (Tivoli Access Manager) policy stored in master policy database 9. TAM policy construction tools in AC manager 7 provide a sophisticated mechanism for high-level policy definition and modification in response to administrator input. However, to allow implementation of the resulting access control policy by XACML-based authorization server 5, AC manager 7 incorporates a policy conversion mechanism embodying the invention in the form of policy converter 10. Policy converter 10 is indicated schematically in the figure as implemented by policy analysis and conversion logic 11 together with working memory 12, where the memory 12 here forms part of the overall memory of server 7. In general, the control logic 11 of policy converter 10 may be implemented in hardware or software or a combination thereof. In the present example, the logic is implemented by software running on AC manager server 7, and suitable software will be apparent to those skilled in the art from the description of operation herein.

Figure 2:
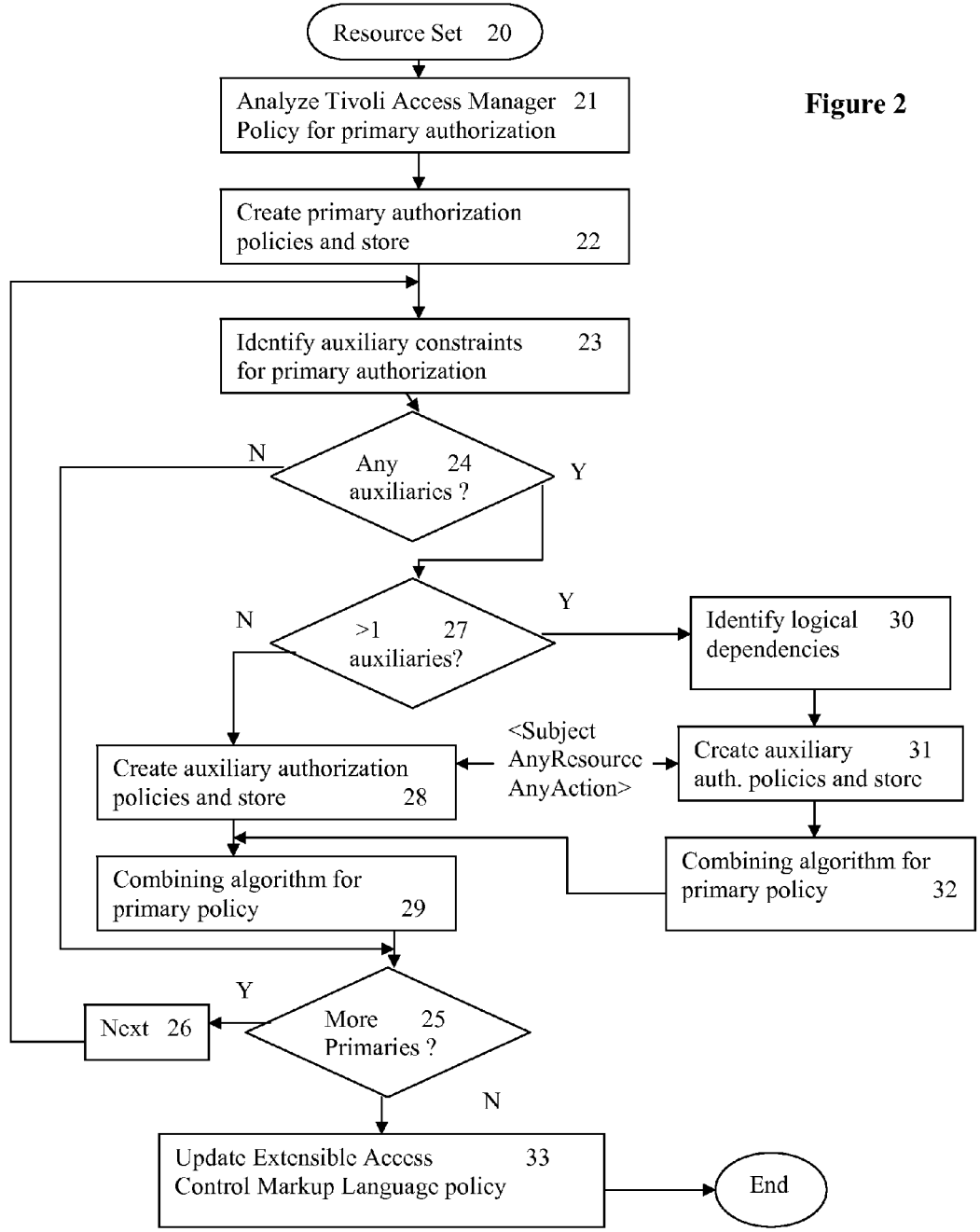
FIG. 2 is a flow chart indicating key steps in operation of the policy conversion method.

Policy converter 10 is operative in response to administrator input to generate an XACML policy data structure from a TAM policy data structure stored in TAM database 9. This conversion from a TAM policy representation to an XACML representation can be performed for a specified set of resources defined by the administrator. By specifying all resources, the policy conversion could be performed for the entire TAM policy, for example after initial construction of a new access control policy for the system. By specifying a subset of resources, only those parts of the TAM policy data structure that relate to those particular resources will be converted. This may be done, for example, when additions or changes are made to the TAM policy which need to be mirrored in the XACML policy. Either way, the key steps in the ensuing policy conversion process are indicated in the flow chart of FIG. 2.

Operation is initiated at step 20 in response to specification of the resource set as described above. In step 21, analysis logic 11 of policy converter 10 analyzes the TAM policy in database 9 to identify all primary authorizations expressed in that policy relating to the specified resources. As described earlier, a primary authorization here is an authorization which might be specified in the subject, resource, action (SRA) triple of an XACML access query. In general, the corresponding SRA elements might be expressed explicitly or implicitly in the TAM policy structure, the analysis logic 11 being adapted to interpret the data structure accordingly. Next, in step 11, logic 11 generates an XACML policy for each primary authorization identified in step 10. Primary authorizations may be grouped as appropriate in the policies created here, but each primary authorization will have an XACML access rule which expresses that authorization in terms of its SRA elements. The resulting primary authorization policies are temporarily stored in working memory 12.

In the subsequent process, the primary authorization policies ("primary policies") stored in memory 12 are considered in turn. In step 23, logic 11 analyzes the TAM policy in database 9 to identify any auxiliary constraints associated with the primary authorization(s) in the first primary policy. As described earlier, auxiliary constraints here may be additional authorizations, conditions, restrictions etc., expressed in the TAM policy which affect applicability of the primary authorization, and must therefore be considered in conjunction with the primary authorization to accurately express the source policy access requirements. Again, the SRA elements of auxiliary constraints might be expressed explicitly or implicitly in the TAM data structure, the analysis logic 11 being adapted to interpret the data structure appropriately to identify relevant constraints. Particular examples of auxiliary constraints which might be expressed in the TAM policy and identified by the policy converter are the Traverse, ByPass-POP and ByPassRule authorizations discussed. If no auxiliary constraints are identified for the primary policy, represented by a "No" at decision block 24, the operation proceeds to decision step 25. Here the policy converter logic decides if all primary polices created in step 22 have been dealt with. If not, the next policy is selected in step 26 and operation reverts to step 23 for this policy.

Returning to step 24, a "Yes" decision here leads to decision step 27 where the conversion logic 11 determines if more than one auxiliary constraint has been located for the primary policy. If not, operation proceeds to step 28 where the conversion logic generates an XACML policy for the sole identified auxiliary constraint. This auxiliary constraint policy ("auxiliary policy") will have an XACML access rule expressing the constraint in terms of SRA elements which are determined as follows. Firstly, the subject element is copied from the subject element expressed (explicitly or implicitly) in the TAM policy for the auxiliary constraint. Secondly, the resource and action elements are specified as wildcard elements AnySubject, AnyAction respectively. In this embodiment, the conversion logic includes in the auxiliary policy a final "fall-through" rule which always denies access. The effect of this will be illustrated in the examples below. The resulting auxiliary policy is then stored in working memory 12. Next, in step 29 the conversion logic defines in memory 12 a logical algorithm combining the auxiliary policy with its associated primary policy such that the policy combination evaluates correctly in accordance with the combined constraints in the TAM policy. That is, the algorithm is selected here such that evaluation of the policy combination for an XACML access query corresponding to the primary authorization yields the same result as in the TAM policy data structure where the effect of the auxiliary constraint would be accounted for. In the present case, the conversion logic 11 selects either the XACML permit-overrides algorithm (which corresponds to a logical OR), or the XACML deny-overrides algorithm (logical AND) depending on the effect of the rule expressing the auxiliary constraint. This will be demonstrated by examples below. Following completion of this XACML data structure component for the current primary policy, operation continues to step 25 and reverts to step 23 for the next primary policy.

Returning to step 27, if a plurality of auxiliary constraints have been identified, these are analysed in step 30 by the conversion logic 11 to identify any logical dependencies among the constraints, e.g. where one constraint is an additional, auxiliary constraint to one or more others. This will be illustrated in the examples below. In step 31, auxiliary policies are generated for each auxiliary constraint. Auxiliary constraints may be grouped, if appropriate, in an auxiliary policy, but each auxiliary constraint is expressed by an XACML access rule whose SRA elements are determined exactly as in step 28. The resulting auxiliary policies are temporarily stored in working memory 12. Next, in step 32, for any logical dependency identified in step 30, conversion logic 11 defines a logical algorithm in memory 12 to combine the corresponding auxiliary polices in accordance with that logical dependency. Again, the conversion logic 11 selects either the permit-overrides or the deny-overrides algorithm according to the nature of the dependency to be expressed, as illustrated in the examples below. Operation then continues to step 29 where conversion logic 11 defines the main algorithm for combining the set of auxiliary policies with the current primary policy as already described, the algorithm being selected here in dependence on the effect of the "main" auxiliary policy or policy group in any main/auxiliary dependency relationship.

Once all primary policies have been addressed as above, a "No" at decision step 25 leads to step 33. Here, the data structure stored in memory 12 after the above process is copied into XACML policy database 6 to update the XACML policy data structure for the resources in question. The policy conversion operation is then complete. In this way, the access control policy can be defined and managed at a high level via the TAM system, with policy updates effectively being translated to the XACML standard for implementation of the core access control system. In particular, the effect of the conversion process just described is that evaluation of the XACML policy for an access query corresponding to a primary authorization yields the same result as in the TAM policy even where the primary authorization is subject to auxiliary constraints in the TAM policy. This is illustrated by the following examples.

The first example demonstrates the effect of the conversion process for the scenario considered earlier, where the TAM policy specifies that user 'Alice' can read the order for a new bicycle if she has the Read permission on object 'Order/Bicycle' and the Traverse permission on the parent object 'Order'. An XACML data structure generated by the above process for this primary/auxiliary authorization pair in the TAM policy might be as follows:

```
<policySet PolicyCombiningAlgorithm="deny-overrides">
    <policy policyId="A" PolicyCombiningAlgorithm="permit-overrides">
        <rule effect="Permit">
            <target <subject Alice>
                <resource Order/Bicycle>
                <action Read>
            </target>
        </rule>
        <!-- additional rules of (main) policy A -->
    </policy>
    <policy policyId="B" PolicyCombiningAlgorithm="permit-overrides">
        <rule effect="Permit">
            <target <subject Dep44>
                <resource AnyResource>
                <action AnyAction> <!-- was Traverse permission -->
            </target>
        </rule>
        <!-- A final, "fall-through" rule that always denies -->
        <rule effect="Deny">
            <subject AnySubject>
            <resource AnyResource>
```

-continued

```
      <action AnyAction>
    </rule>
  </policy>
</policySet>
```

In this XACML policySet, policy A expresses the primary authorization and policy B the auxiliary, Traverse authorization. These authorizations are combined with the "deny-overrides" algorithm; i.e., if either of policies A and B denies access then the XACML decision engines returns deny. Further, in the access rule in auxiliary policy B, the Traverse action has been replaced by AnyAction and the Order resource by AnyResource. Since AnyAction matches the 'Read' action in the primary policy access rule, and AnyResource likewise matches the Order/Bicycle resource in the primary policy access rule, both checks are now performed within a single query evaluation. That is, both the primary and auxiliary authorizations will be evaluated in response to an XACML access query corresponding to the primary authorization: access_allowed(Alice+Dep44,Order/Bicycle,Read). Note that the above construction properly reflects the fact that Alice can only access resource Order/Bicycle if she is a member of group Dep44. If not the final fall-through rule in auxiliary policy B would match and thus deny access.

As a second example, assume that users Alice and Bob have Read access to resource 'Car' in the TAM policy. An additional constraint, represented by a Protected Object Policy (POP) in the overall TAM policy is that resource 'Car' can only be accessed during business hours, 8 a.m.-6 p.m. for example. The resulting XACML data structure produced for this primary/auxiliary authorization pair is as shown below.

```
<policySet policysetId="Example2"
PolicySetCombiningAlgorithm="deny-overrides">
  <policy policyId="C" PolicyCombiningAlgorithm="permit-overrides">
    <rule effect="Permit">
      <target <subject Alice>
        <resource Car>
        <action Read>
      </target>
    </rule>
    <rule effect="Permit">
      <target <subject Bob>
        <resource Car>
        <action Read>
      </target>
    </rule>
    <!-- additional rules of (main) policy A -->
  </policy>
    <policy policyId="D"
    PolicyCombiningAlgorithm="permit-overrides">
    <rule effect="Permit">
    <target>
      <subject AnySubject>
        <resource AnyResource>
        <action AnyAction>
    </target>
      <condition "time-of-day within interval" />
    </rule>
    <!-- A final, "fall-through" rule that always denies -->
    <rule effect="Deny">
      <subject AnySubject>
      <resource AnyResource>
      <action AnyAction>
    </rule>
  </policy>
</policySet>
```

In the above policy structure, policy C defines the primary authorization 'Read' for Alice and Bob. Policy D expresses the auxiliary constraint (condition on time-of-day within the 8 a.m.-6 p.m. interval) applying to anyone, again with a fall-through rule which always denies. Both policies are combined into policySet "Example2" by the 'deny-overrides' algorithm which overall denies access if a request is outside the time-of-day interval. According to this policy set, if time-of-day is not within the required interval, access to 'Car' can never be granted regardless of the credentials (subject userid and groupid) of the requester. This is because the policy with policyId="D" will evaluate to 'deny' making the overall policyset evaluate to a 'deny'.

A further example is illustrated by applying an additional constraint (expressed by a Bypass authorization) to the "Example 2" policy scenario above. In particular, the TAM policy contains the auxiliary authorization: user Alice can bypass time-of-day constraints. In the TAM system, this is represented by attaching a Bypass authorization for certain users or groups to a resource. Assume that 'Car' has a time-of-day constraint Bypass authorization for user Alice. The policy conversion process of FIG. 2 will identify this additional auxiliary constraint, tying in an additional auxiliary policy (policyId=E). This auxiliary, Bypass policy is combined with the existing policy representing the time-of-day restriction in a new "Example2withByPass" policyset:

```
<policySet policysetId="Example2"
PolicyCombiningAlgorithm="deny-overrides">
  <policy policyId="C" PolicyCombiningAlgorithm="permit-overrides">
    <rule effect="Permit">
      <target <subject Alice>
        <resource Car>
        <action Read>
      </target>
    </rule>
    <rule effect="Permit">
      <target <subject Bob>
        <resource Car>
        <action Read>
      </target>
    </rule>
    <!-- additional rules of (main) policy A -->
  </policy>
<policySet policysetId="OverrideByPass"
PolicyCombiningAlgorithm="permit-overrides">
  <policy policyId="D" PolicyCombiningAlgorithm="permit-overrides">
    <rule effect="Permit">
      <subject AnySubject>
        <resource AnyResource >
        <action AnyAction>
        <condition "time-of-day within interval" >
    </rule>
    <!-- A final, "fall-through" rule that always denies -->
    <rule effect="Deny">
      <subject AnySubject>
      <resource AnyResource>
      <action AnyAction>
    </rule>
  </policy>
  <policy policyId="E"
  PolicyCombiningAlgorithm="permit-overrides">
    <rule effect="Permit">
      <target <subject Alice>
        <resource AnyResource >
        <action AnyAction> <!-- was ByPassPOP permission -->
      </target>
    </rule>
    <!-- A final, "fall-through" rule that always denies -->
    <rule effect="Deny">
      <target>
        <subject AnySubject>
        <resource AnyResource>
        <action AnyAction>
      </target>
    </rule>
```

```
        </policy>
    </policySet>
</policyset>
```

Note that, in this example, the new policy E is combined with the existing time-of-day policy B in a 'permit-overrides' manner in order to preserve the semantics. It will now be seen that, if the user requesting access is Alice, the policy with policyId=E will evaluate to 'permit' whereby the enclosing policyset "Example2withByPass" evaluates to 'permit' regardless of the time-of-day evaluation.

Note that, in the second and third examples above, policies D and E could have specified the resource as "Car", as for the corresponding constraint in the TAM policy, because this matches that in the primary authorization policy. However, the exemplary process of FIG. 2 always replaces the resource and action elements by wildcards for simplicity. Also, while the third policy set illustrates a simple case of logical dependency among auxiliary polices (policies D and E here), in general multiple auxiliary policies can be nested via logical dependencies. In general, for any primary/auxiliary or auxiliary/dependent auxiliary policy combinations, the logical combining algorithm selected by the conversion logic depends on the dependent policy, and in particular the effect of the rule(s) expressing the dependent authorization(s). Hence, various combinations of permit/deny-override algorithms are possible.

It will seen that the policy conversion system described above solves the problem of dealing with auxiliary constraints on conversion of policy data structures to a single-authorization-query system, allowing the authorization subtleties achieved via auxiliary constraints in the TAM system to be exactly mirrored in the XACML system. Moreover, this solution is completely compatible with the current XACML standards v1.1 and v2.

Various changes can of course be envisaged to the particular example described above. As a simple example, the policy converter 10 could be provided independently of the access control manager 7 if described. Moreover, while FIG. 1 illustrates one particular scenario where the policy conversion system might be employed, here to facilitate migration from a TAM policy-based system to an XACML-policy based system, other applications can be envisaged. For example, the policy conversion system could be employed to translate a policy used by an access control system to an XACML policy representation to facilitate policy analysis and comparison at a higher level, allowing XACML to be used as a common platform for policy analysis. Of course, while conversion of a TAM policy to XACML has been described, the technique can of course be applied for converting from different source policies to other single-access-query systems. Many other changes and modifications can be made to the examples described without departing from the scope of the invention.

The invention claimed is:

1. A method for generating an access control policy data structure for a single-authorization-query access control system from a source policy data structure of an access control system in which primary authorizations can be subject to auxiliary constraints, authorizations in said data structures being defined in terms of subject, resource and action elements, the method comprising:

for each resource in a set of resources in the source policy data structure, analyzing the source policy data structure to identify primary authorizations relating to that resource;

for each primary authorization, generating and storing policy data representing a policy defining an access rule expressing that authorization in an access control policy data structure; and for each primary authorization, analyzing the source policy data structure to identify any auxiliary constraints associated with that primary authorization, and, for each auxiliary constraint so identified (a) generating and storing, in said access control policy data structure, policy data representing a policy defining an access rule corresponding to the identified auxiliary constraint, the access rule having subject, resource and action elements determined by (a1) copying corresponding elements for the auxiliary constraint, subject to (a2) for each of the resource and action elements, at least if that element does not match that in the primary authorization, replacing the element by a wildcard element, and (b) defining a logical algorithm in the access control policy data structure to combine the auxiliary constraint policy with the primary authorization policy such that evaluation of the policy combination for an access query corresponding to the primary authorization yields the same result as in the source policy data structure.

2. A method as claimed in claim 1 wherein said auxiliary constraints comprise auxiliary authorizations.

3. A method as claimed in claim 1 wherein, in step (b), the logical algorithm is one of a logical OR and a logical AND algorithm.

4. A method as claimed in claim 1 including, for any primary authorization for which a plurality of auxiliary constraints are identified:

analyzing those constraints to identify any logical dependencies among the constraints; and for each logical dependency so identified, defining a logical algorithm in the access control policy data structure to combine the auxiliary constraint policies for the dependent constraints in accordance with that logical dependency.

5. A method as claimed in claim 1 including, in step (a2), replacing each of the resource and action elements by a wildcard element regardless of whether the element matches that in the primary authorization.

6. A method as claimed in claim 1 wherein said set of resources comprises all resources in the source policy data structure.

7. A method as claimed in claim 1 including, in step (a), defining in the auxiliary constraint policy a fall-through rule which always denies access.

8. A method as claimed in claim 1 wherein the access control policy data structure is an XACML policy data structure.

9. A method as claimed in claim 1 wherein the source policy data structure represents an access control policy of a Tivoli Access Manager system, and wherein said auxiliary constraints comprise Traverse, ByPassPOP, and ByPassRule authorizations in the policy data structure.

10. A computer program comprising program code means for causing a computer to perform a method for generating an access control policy data structure for a single-authorization-query access control system from a source policy data structure of an access control system in which primary authorizations can be subject to auxiliary constraints, authorizations in said data structures being defined in terms of subject, resource and action elements, the method comprising:

for each resource in a set of resources in the source policy data structure, analyzing the source policy data structure to identify primary authorizations relating to that resource;

for each primary authorization, generating and storing policy data representing a policy defining an access rule expressing that authorization in an access control policy data structure; and for each primary authorization, analyzing the source policy data structure to identify any auxiliary constraints associated with that primary authorization, and, for each auxiliary constraint so identified (a) generating and storing, in said access control policy data structure, policy data representing a policy defining an access rule corresponding to the identified auxiliary constraint, the access rule having subject, resource and action elements determined by (a1) copying corresponding elements for the auxiliary constraint, subject to (a2) for each of the resource and action elements, at least if that element does not match that in the primary authorization, replacing the element by a wildcard element, and (b) defining a logical algorithm in the access control policy data structure to combine the auxiliary constraint policy with the primary authorization policy such that evaluation of the policy combination for an access query corresponding to the primary authorization yields the same result as in the source policy data structure.

11. Apparatus for generating an access control policy data structure for a single-authorization-query access control system from a source policy data structure of an access control system in which primary authorizations can be subject to auxiliary constraints, authorizations in said data structures being defined in terms of subject, resource and action elements, the apparatus comprising:

memory for storing the data structures; and control logic configured:

for each resource in a set of resources in the source policy data structure, to analyze that source policy data structure to identify primary authorizations relating to that resource;

for each primary authorization, to generate and store in the memory an access contol policy data structure comprising policy data representing a policy defining an access rule expressing that authorization; and for each primary authorization, to analyze the source policy data structure to identify any auxiliary constraints associated with that primary authorization, and, for each auxiliary constraint so identified (a) to generate and store in the access control policy data structure in the memory policy data representing a policy defining an access rule corresponding to that constraint, the access rule having subject, resource and action elements determined by (a1) copying the corresponding elements for the auxiliary constraint, subject to (a2) for each of the resource and action elements, at least if that element does not match that in the primary authorization, replacing the element by a wildcard element, and (b) to define a logical algorithm in the access control policy data structure to combine the auxiliary constraint policy with the primary authorization policy such that evaluation of the policy combination for an access query corresponding to the primary authorization yields the same result as in the source policy data structure.

12. Apparatus as claimed in claim 11 wherein the auxiliary constraints comprise auxiliary authorizations.

13. Apparatus as claimed in claim 11 wherein the control logic is configured such that, in step (b), the logical algorithm is one of a logical OR and a logical AND algorithm.

14. Apparatus as claimed in claim 11 wherein the control logic is configured such that, for any primary authorization for which a plurality of auxiliary constraints are identified, the control logic:

analyzes those constraints to identify any logical dependencies among the constraints; and for each logical dependency so identified, defines a logical algorithm in the access control policy data structure to combine the auxiliary constraint policies for the dependent constraints in accordance with that logical dependency.

15. Apparatus as claimed in claim 11 wherein the control logic is configured such that, in step (a2), the control logic replaces each of the resource and action elements by a wildcard element regardless of whether the element matches that in the primary authorization.

16. Apparatus as claimed in claim 11 wherein the control logic is configured such that, in step (a), the control logic defines in the auxiliary constraint policy a fall-through rule which always denies access.

17. Apparatus as claimed in claim 11 for generating an XACML access control policy data structure.

18. Apparatus as claimed in claim 11 for generating the access control policy data structure from a source policy data structure which represents an access control policy of a Tivoli Access Manager system, the control logic being configured to analyze the source policy data structure for each said primary authorization to identify auxiliary constraints comprising Traverse, ByPassPOP, and ByPassRule authorizations associated with that primary authorization.

* * * * *